United States Patent
Logan et al.

[11] Patent Number: 6,158,532
[45] Date of Patent: *Dec. 12, 2000

[54] SUBASSEMBLY ELECTRICAL ISOLATION CONNECTOR FOR DRILL ROD

[75] Inventors: Derek W. Logan; Anthony Robert Dopf; Paul L. Camwell, all of Calgary, Canada

[73] Assignee: Ryan Energy Technologies, Inc., Calgary, Canada

[*] Notice: This patent is subject to a terminal disclaimer.

[21] Appl. No.: 09/240,140

[22] Filed: Jan. 29, 1999

Related U.S. Application Data

[63] Continuation-in-part of application No. 09/044,423, Mar. 19, 1998.

[30] Foreign Application Priority Data

Mar. 16, 1998 [CA] Canada .................................. 2232213

[51] Int. Cl.⁷ ...................................................... G01V 1/00
[52] U.S. Cl. ............................... 175/320; 175/40; 285/48
[58] Field of Search .............................. 175/40, 50, 320; 285/48, 50, 53, 294.3, 294.4, 296.1

[56] References Cited

U.S. PATENT DOCUMENTS

| | | | |
|---|---|---|---|
| 4,684,946 | 8/1987 | Issenmann | 340/855 |
| 5,138,313 | 8/1992 | Barrington | 340/854.6 |
| 5,163,714 | 11/1992 | Issenmann | 285/54 |
| 5,394,141 | 2/1995 | Soulier | 340/854.4 |
| 5,467,832 | 11/1995 | Orban | 175/45 |
| 6,050,353 | 4/2000 | Logan et al. | 175/320 |

FOREIGN PATENT DOCUMENTS

| | | |
|---|---|---|
| 1217231 | 1/1987 | Canada . |
| 1323691 | 10/1993 | Canada . |
| 2151525 | 12/1996 | Canada . |

*Primary Examiner*—William Neuder
*Attorney, Agent, or Firm*—Lee, Mann, Smith, McWilliams, Sweeney & Ohlson

[57] ABSTRACT

A subassembly electrical isolation connector for interconnecting adjacent tubular drill rods of a drilling system used in drilling bore holes in earth formations electrically isolates the inner connection of the drill rods. The connector comprises a housing, a mandrel, a connector for connecting the housing to a first tubular drill rod, a connector for connecting a mandrel to a second tubular drill rod and a device for interconnecting the housing and the mandrel in a manner to electrically isolate the housing from the mandrel with the housing overlapping at least a portion of the mandrel. The housing has an isolated end which is electrically isolated from the mandrel and the connector for connecting the mandrel to a second tubular drill rod. Such arrangement provides enhanced strength to resist bending moments along the connector and resisting drilling forces. The subassembly is particularly useful in applications involving directional drilling in earth formations, particularly oil well drilling, the drilling of bore holes under river beds and other obstacles and earth formations, bore hole inspection systems, directional drilling in respect of geothermal wells, ventilation shaft drilling in mineral mining formation and the like.

18 Claims, 11 Drawing Sheets

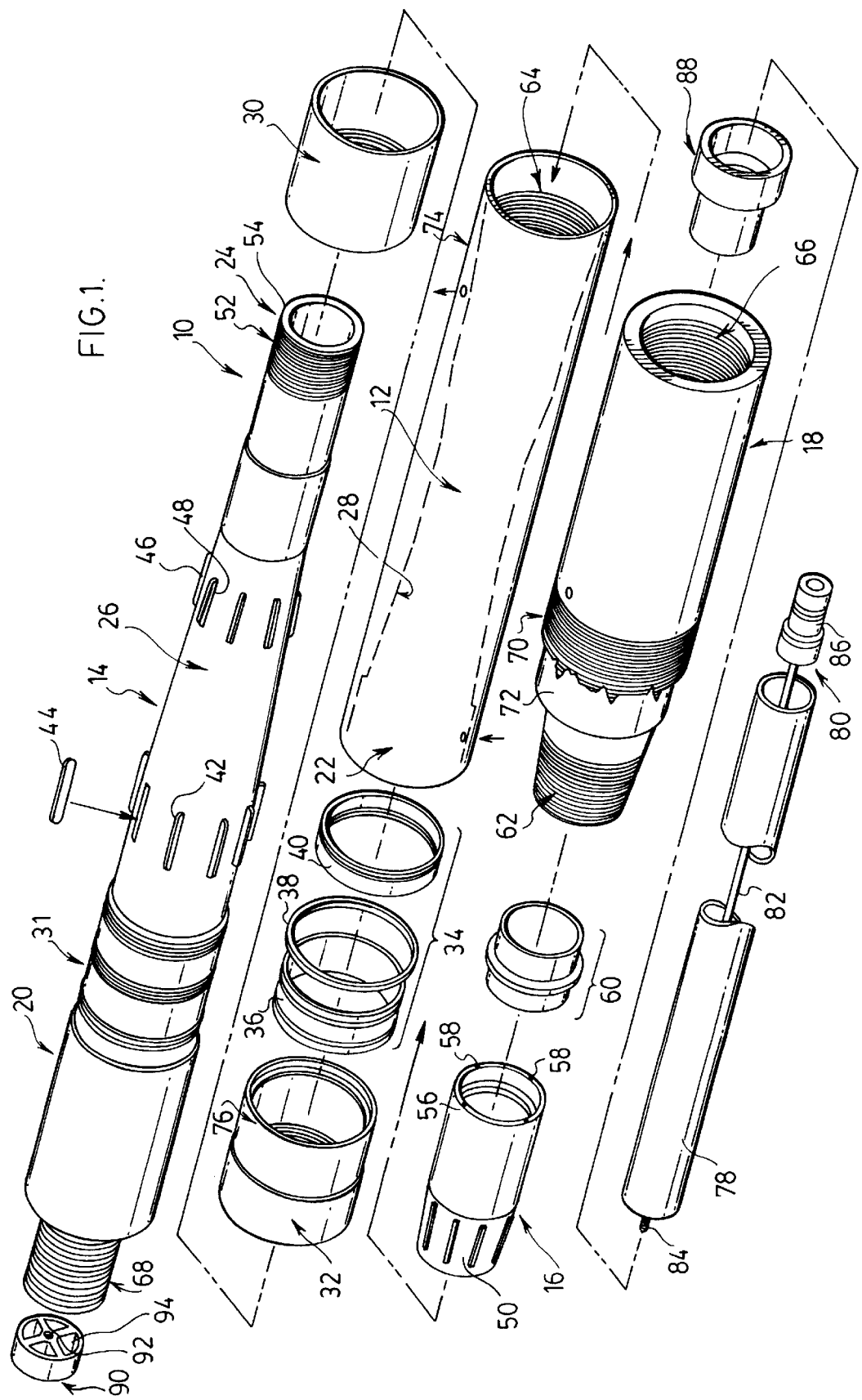

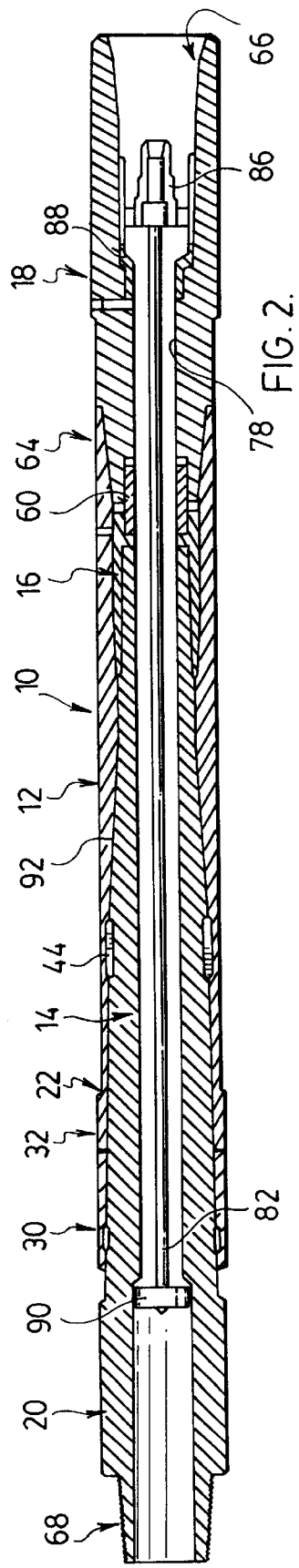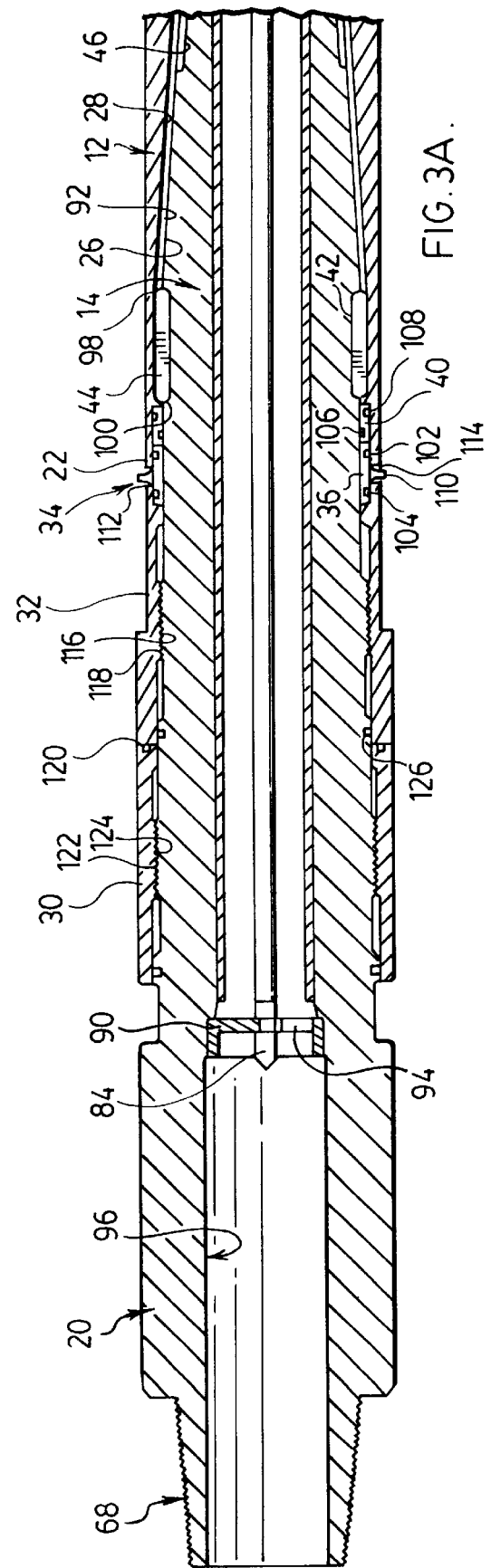

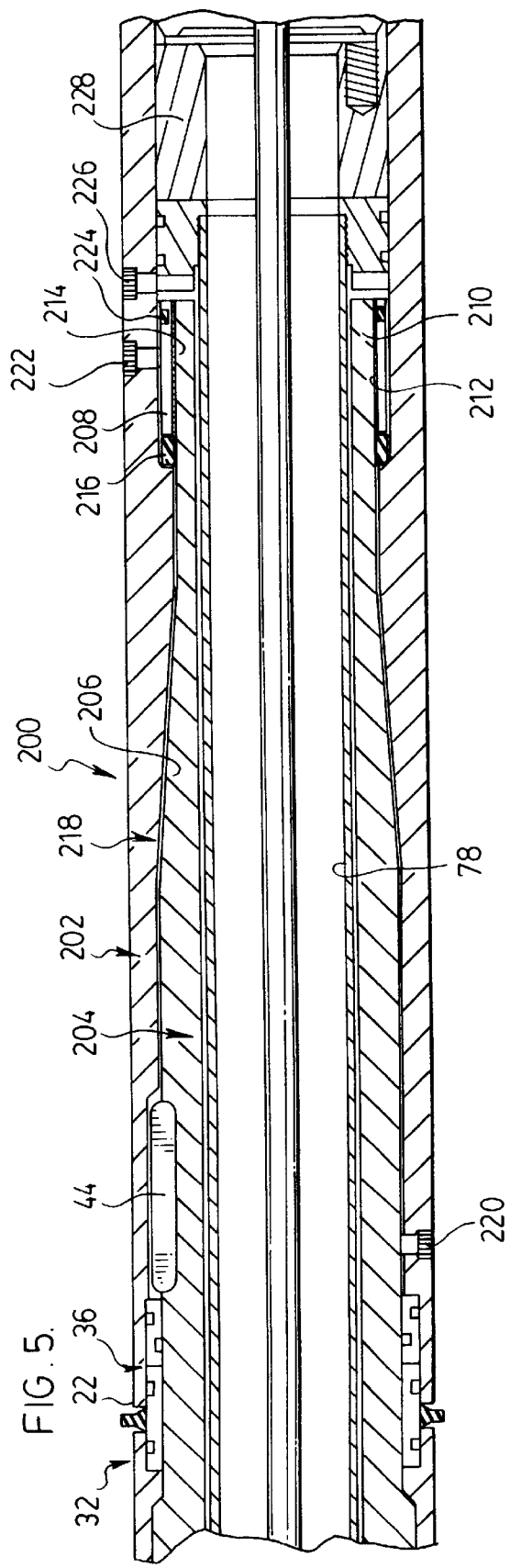

SUBASSEMBLY ELECTRICAL ISOLATION CONNECTOR FOR DRILL ROD

This application is a continuation-in-part of application Ser. No. 09/044,423 filed Mar. 19, 1998.

FIELD OF THE INVENTION

This invention relates to a subassembly electrical isolation connector for interconnecting adjacent tubular drill rods of a drilling system used in drilling bore holes in earth formations and more particularly, where the electrical isolation sub is used in conjunction with a system for electrically transmitting signals to the earth's surface.

BACKGROUND OF THE INVENTION

There is a continuing demand to enhance the functioning of the electrical components and mechanical components associated with the transmission of electromagnetic signals from a location at great depths in the earth to the earth's surface. Such communication is used in various types of drilling operations, such as measuring while drilling (MWD) and/or logging while drilling (LWD). Other situations, which warrant communication with the earth surface, is during the inspection and evaluation of bore holes. Such communication is particularly important when carrying out directional drilling such as under river beds, subways, unusual earth formations and tapping oil reservoirs. It is important at all times to know precisely the location of the drill bit. A significant effort has been made to develop electrical instruments which are capable of transmitting signals at the drill face or inspection face back to the earth's surface. Some systems involve the use of the lower portion of the drill string as an antenna for purposes of transmitting via electromagnetic waves, information to the earth's surface, such as described in U.S. Pat. No. 5,394,141. Such system does not involve the use of an isolation subassembly in the drill string.

Various types of devices which are mounted on the outside of the drill string for monitoring surrounding conditions and/or used in communication are described, for example, in U.S. Pat. No. 4,684,946 to Geoservices and U.S. Pat. No. 5,467,832 to Schlumberger Technology Corporation. The problem with mounting communication devices and sensing devices on the exterior of the drill string is that particularly with directional drilling the exterior devices are damaged by striking the formations about the bore hole.

In order to enhance communication with the earth's surface, it is preferred to electrically isolate drill string components so that electromagnetic signals can be developed for data telemetry. This is achieved by a subassembly connector which electrically isolates adjacent drill string components so that the isolated components provide the two terminals of an antenna to which an alternating current is applied in developing the electromagnetic signal for transmission to the earth's surface. Examples of such connectors are described in U.S. Pat. No. 5,138,313 to Haliburton Company; U.S. Pat. No. 5,163,714 to Geoservice and Canadian patent application 2,151,525 to McAllister Petroleum Services, Ltd. The various types of subassemblies provide for electrical isolation which are particularly useful in bore hole inspection, but may be subject to failure when used, for example, in directional drilling. It has been found that the drill string, and in particular the subassembly connector, is subjected to extreme torsional compression, tension, and bending moments during directional drilling. Such extreme forces can result in connector failure, usually at the weakest point in the subassembly. The connectors of these patents and patent application may fail due to overstressing and possibly break up at their weakest point. The connectors may even fail to the extent, particularly those of the US patents, that retrieval of the drill bit and other components below the subassembly cannot be achieved.

In accordance with an object of an aspect of this invention, a subassembly electrical isolation connector is provided which has enhanced strength characteristics for resisting drilling forces, particularly during directional drilling, ensures electrical isolation between adjacent drill string components and in the event of connector failure, ensures retrieval of drill string components below the subassembly.

SUMMARY OF THE INVENTION

In accordance with an aspect of the invention, a subassembly electrical isolation connector for interconnecting adjacent tubular drill rods of a drilling system used in drilling bore holes in earth formations, electrically isolates the interconnected drill rods. The connector comprises:

i) a housing;
ii) a mandrel;
iii) means for connecting said housing to a first tubular drill rod;
iv) means for connecting said mandrel to a second tubular drill rod;
v) means for interconnecting said housing and said mandrel in a manner to electrically isolate said housing from said mandrel with said housing overlapping at least a portion of said mandrel;
vi) said housing having an end which is electrically isolated from said mandrel and said means for connecting said mandrel to a second tubular drill rod;
vii) said interconnecting means including a tubular fastener for threadable engagement with said mandrel and said tubular fastener having a shoulder for engagement with said housing to advance said housing over said mandrel;
viii) means for blocking advance of said housing onto said mandrel to ensure definition of an electrical insulation space between said mandrel and said housing.

Conical tapered surfaces are preferably provided on the housing and the mandrel to facilitate centered connection. Preferably the housing has a second tapered surface converging inwardly towards the first tapered surface to further enhance the strength characteristics of the connector. In the event of connector break-up due to excessive drilling forces, the preferred second tapered surface in the housing and on the connector provide for connector and downstream component retrieval. A gasket assembly may be provided at the housing isolated end and clamped in place to accommodate flexure between housing and mandrel during directional drilling operations. The subassembly electrical isolation connector is particularly useful in directional drilling operations, drilling around earth formations, river beds, subways and the like, mineral mining operations and bore hole inspection.

BRIEF DESCRIPTION OF THE DRAWINGS

Preferred embodiments of the invention are shown in the drawings wherein:

FIG. 1 is an exploded view in perspective of the subassembly electrical isolation connector;

FIG. 2 is a section through the connector assembly of FIG. 1 assembled and connected to adjacent drill rods;

FIGS. 3A, 3B and 3C are enlarged sections of the connector in FIG. 2 showing further details of the assembly;

FIG. 5 is an enlarged cross-sectional view of a second alternative embodiment for the connector assembly;

DETAILED DESCRIPTION OF THE PREFERRED EMBODIMENTS

Figure 3B:
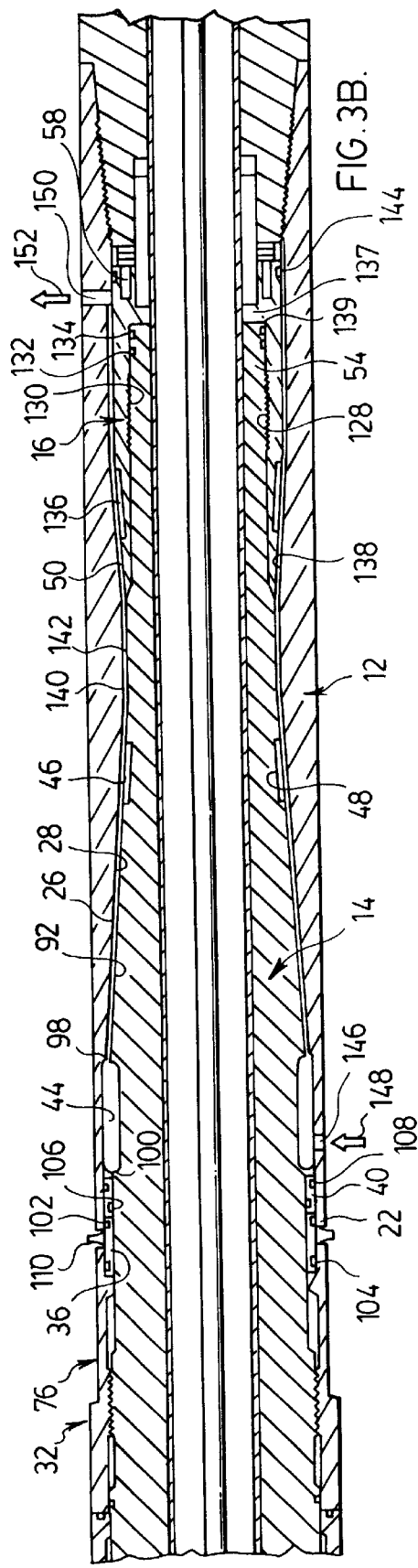

Various aspects of the invention are described in detail where it is appreciated that the principles of the invention, as established in the detailed description of the drawings, may find application in drilling a variety of bore holes in earth formations. The purpose of the subassembly of this invention is to electrically isolate drill rod components to facilitate establishment of an antenna preferably adjacent the location of the drill bit. Signals are transmitted from the depths of the earth formation via the antenna. The subassembly is particularly useful in directional drilling applications because of its ability to withstand all types of drilling forces including torsion, bending moment, compression and tension. Furthermore, the design of the subassembly, in accordance with this invention, ensures retrieval of the drill bit and other components below the subassembly in the event that the subassembly should fail due to overloading. This feature may be achieved by the unexpected realization that the housing and the mandrel in the subassembly, in accordance with one embodiment of the invention, have mating, conical, tapered body portions where the taper converges inwardly away from the housing isolated end and where the housing overlaps at least a portion of the mandrel which is unlike the prior art. As will become apparent from the detailed description of the various aspects of this invention, this feature solves many of the problems associated with the prior art devices.

With reference to FIG. 1, the subassembly electrical isolation connector 10, in accordance with a first embodiment, is shown in a ready to assemble format. The connector comprises a housing 12 and a mandrel 14. In accordance with this particular embodiment, a tapered locking collar 16 interconnects the housing and the mandrel. A coupler 18 is provided for connecting the housing 12 to a first tubular drill rod. The mandrel 14 includes an integral coupler 20 for connecting the mandrel to a second tubular drill rod. As will be described in more detail, the housing has an end 22 which will be electrically isolated from the mandrel and the coupler 20 for connecting the mandrel to the second drill rod. Also, as will be described in more detail, the tapered collar 16 which threads onto the mandrel end 24, completes the interconnection of the housing to the mandrel and achieves such interconnection in a manner to electrically isolate the mandrel from the housing. The mandrel 14 has a conical tapered body portion 26 which is located within the housing 12 and the housing 12 has a correspondingly conically tapered inner surface shown in dot at 28. The conical taper for the housing and the mandrel both converge inwardly away from the housing isolated end 22. The connector 10 is assembled by threading locking collar 30 onto the base portion 31 of the mandrel, which in accordance with this embodiment is integral with the coupler 20. A gasket assembly jamming nut 32 is also threaded onto the base 31 of the mandrel. The gasket assembly 34 is placed over the mandrel between the jam nut 32 and the isolated end 22.

The gasket assembly comprises a first "O"-ring carrier 36 over which a ring seal 38 is provided. In addition, there is an adjacent "O"-ring carrier 40, the assembly of which will be described with respect to FIG. 3A. The housing 12 may then be placed over the tapered portion 26 of the mandrel 14. The mandrel 14 comprises a plurality of longitudinally extending circumferentially spaced apart slots 42 which are located on the planar land portion of the mandrel. Although not shown, the housing has on its inside surface 28, corresponding slots to match up with slots 42 where the slots open towards the isolated end 22 of the housing. Positioned within the slots 42 are a plurality of precisely machined locking keys 44. The keys 44 are made of a synthetic electrically non-conductive material which have sufficiently high sheer resistance to transfer torque transmitted from the drill rod through coupler 20 to the housing 12. The keys 44 are precisely machined to fit within the slots 42 and mate with corresponding slots in the housing 12. The key sizing is selected to locate the housing relative to the mandrel in a manner to be discussed with respect to FIGS. 3A and 3B which defines a space between the mandrel and the housing. As will be described, that space is filled with electrically non-conductive material which may also serve to bond the tapered faces 26 and 28 together. To facilitate guiding of the housing 12, onto the tapered mandrel 14, a plurality of sacrificial bushings 46 are located in slots 48. The bushings 46 are spaced from the sheer keys 44 in a direction towards the end 24 of the mandrel. The bushings 46 are made of a soft material such as nylon which readily compress but serve to guide and locate the housing on the tapered portion of the mandrel 14 and maintain the space therebetween until potted with a suitable non-conductive resin. In order to secure the housing 12 on the tapered mandrel, the tapered locking collar 16 has an internal thread in its tapered portion 50 which threads onto the threaded end 52 of the mandrel 24. Also provided on the end 24 of the mandrel, are two "O"-ring grooves 54. To facilitate tightening of the tapered collar 16 on the mandrel, the collar has on its outer end portion 56 a plurality of bores 58 which extend into the collar and allow engagement of a suitable pin wrench to facilitate tightening of the collar to a predetermined torque. The extent to which the tapered collar 16 snugs up the housing on the tapered mandrel is, as already noted, determined by the precisely machined keys 44, as captured in the correspondingly machined slots 42. A further gasket assembly 60 is fitted in the end 56 of the tapered collar 16 and also fits within the threaded end 62 of the coupler 18. The coupler 18 has its threaded end portion 62 machined to thread within the threaded end portion 64 of the housing 12. The coupler 18 includes a female threaded portion 66 for receiving the threaded male end of the upper first drill rod. Correspondingly, the coupler 20 has a male threaded end portion 68 for receiving the female threaded portion of a lower second drill rod. With the coupler assembled, a protective abrasion resistant wrapping 70 is applied to the exterior of the shoulder 72 of the coupler 18, the exterior 74 of the housing 12 and the exterior of the shoulder 76 of jam nut 32. The diameter of the shoulders 72, 74 and 76 are essentially the same and thereby accommodate the thickness of the protective wrapping 70. The wrapping may consist of fibrous material in the shape of twine wrapped about the shoulder 72, 76 and housing outer surface 74 and embedded in an abrasion resistant plastic material, usually a cured epoxy.

With the coupler assembled, it is hollow through the middle. A wash tube 78 is inserted through the center of the coupling. The wash tube provides a wear resistant electrical insulation for the internal part of the isolation joint. Within the wash tube 78 is an antenna conductor 80 having a rod portion 82 with a threaded end 84, and an electrical coupler 86 at the other end. The wash tube is electrically isolated from the coupler 18 by a collar of non-conductive synthetic material 88. The free end 84 is supported within the mandrel 14 by a disc 90 having threaded aperture 92 to receive the threaded end 84. To allow drill fluid or medium or the like to pass through this cavity, four apertures 94 are provided in the disc 90.

The connector 10 of FIG. 1 is shown in its assembled form in FIG. 2 where the housing 12 has the mandrel 14 telescoped therein and secured in place by tapered collar 16. Lock nut 30 holds jam nut 32 in place with the gasket assembly sandwiched against the isolated end 22 of the housing. Coupling 18 is threaded into the threaded end 64 of the housing. The tapered locking collar 16 is electrically isolated from the coupler 18 by way of gasket assembly 60. As will be described in respect of FIG. 3B, the space 92 between the tapered surface 26 of the mandrel 14 and the tapered surface 28 of the housing 12 is filled with an electrically non-conductive polymeric material which bonds the housing to the mandrel. The polymer secures in place the keys 44 which interconnect the housing to the mandrel to transfer torque applied to the coupler 18 through the housing into the mandrel and in turn through to coupler 20 so that drilling forces are transferred from a first drill rod through to a second drill rod. The wash tube 78 is located within the tubular hollow portion of the connector and secured within the insulated collar 88. The electrical connection 86 is positioned at one end of the tube 78 and the other end of the antenna 82 is threaded into the disc 90. An alternating signal is applied to the coupler 18 or the drill rod attached thereto, which is electrically insulated from the antenna electrode 82 which applies the balance of the signal to the coupler 20. The connector 10 and drill rods connected to opposite ends of the connector function as an antenna for transmitting an electromagnetic signal back to the surface, for example, in the manner described in the aforementioned U.S. Pat. Nos. 5,138,313 and 5,163,714.

With reference to FIG. 3A, the lower portion of the connector is shown. The coupler 20 has a male threaded end portion 68 for connection to the lower drill rod component which, for purposes of discussion, is referred to as a second tubular drill rod. The coupler 20 is integral with the mandrel 14 and has a central bore 96 which provides for drilling fluid and the like to be passed through the connector. The disc 90 into which the threaded end 84 of the antenna is located has openings 94 which allow drilling fluid to pass therethrough. The drilling torque which is applied to the upper coupler and which is transferred to the housing is in turn transferred to the mandrel 14 by way of keys 44 which are fabricated of a synthetic material. The selected material can withstand the sheer forces applied by the housing to the keys. As will be described with respect to the use of the tapered collars 16, the manner in which the subassembly is connected defines the space 92 between the tapered surfaces. During this assembly, the bushings 46 along with gasket assembly 40 serve to guide and position the housing relative to the mandrel in spacing the items apart. The bushings 46 are made of sufficiently soft material to provide such guidance, but do not interfere with the development of the space 92 between the mandrel and the housing.

The isolated end 22 of the housing is electrically insulated from the jam nut 32 by way of gasket assembly 34. The gasket assembly 34 has an O-ring seal carrier 36 which has O-rings 102 and 104 provided therein which seal against the jam nut 32 and the isolated end 22 of the housing. In addition, a further O-ring carrier 40 is provided which has an O-ring 106 on the inside for contacting the mandrel and O-ring 108 for contacting the underside of the isolated end of the housing 22. In addition, a seal ring 110 is slid onto the O-ring carrier 36 and is squeezed between the forward end 112 of the jam nut 32 and the adjacent edge 114 of the housing 12. The ring 110 is compressed between these faces to ensure a water tight seal. The gasket assembly 34 is made of electrically non-conductive materials to electrically isolate the end 22 of the housing from the jam nut 32 and as well from the mandrel 14. The jam nut is threaded towards the housing 12 after the housing is located. The jam nut 32 engages the external thread 116 by virtue of the internal thread 118 of the jam nut. When the jam nut is in position and has secured the gasket assembly 34, the lock nut 30 is threaded against the end 120 of the jam nut to lock it in place. The lock nut 30 has an internal thread 122 which engages the thread 124 of the mandrel. Suitable seal such as ring seal 126 may be provided in the mandrel to prevent ingress of any fluid which may leak between the jam nut and the lock ring 30 at face 120.

The tapered threaded collar 16 has its internal threaded portion 128 threaded on the external threaded portion 130 of the mandrel. The collar 16 is threaded onto the mandrel end 54 and is sealed by double O-rings 132 and 134. The tapered portion 50 of collar 16 is tightened in place by a pin wrench fitting within the bores 58. The tapered portion 50 carries the sacrificial nylon bushings 136. The collar 16 is tightened on the threaded end of the mandrel where the tapered portion 50 mates with the tapered interior surface 138. The tapered collar 16, as it is tightened onto to the mandrel, advances the housing onto the mandrel. As previously noted, the gasket assembly 40 locates the free end of the housing relative to the mandrel. The keys 44 also locate the housing relative to the mandrel and the sacrificial keys 46 and 136 also maintain a relative spacing. The tapered collar 16 is threaded onto the mandrel and torqued in place by a suitable wrench engaging pinholes 58. The threaded collar bottoms out on the mandrel as defined by interior ridge 137 abutting the end face 139 of the mandrel 14. The interrelated spacing action of the gasket assembly 40, the keys 44, the sacrificial keys 46 and 136 as well as the bottoming out of the threaded collar on the mandrel between ridge 137 and ridge 139 defines the extent of the space 92 between the mandrel tapered surface 26 and housing internal tapered face 28. Correspondingly, space 92 is between the faces 138 of the housing and the tapered collar 50 and as well, the space 92 is between the opposing transitional faces 140 of the housing and 142 of the mandrel. The locating pins 46 and 136 maintain concentricity of the space, that is a uniform spacing until the injected resin has set. The tapered collar 16 includes a seal 144 to seal off the space 92. O-rings 106 and 108 seal off the other end of the space 92.

A suitable bonding adhesive which is electrically non-conductive is injected through aperture 146 in the direction of arrow 148. A vacuum is applied to aperture 150 so as to draw air from the space 92 in the direction of arrow 152. The resin is pumped into the aperture 142 and is drawn by the vacuum into the space 92 to fill same until resin flows out of the aperture 150. At this point, it is considered that the entire space 92 is filled with resin. The apertures 146 and 150 are plugged and the resin allowed to set which thereby bonds together the faces which define the space 92. As well, the adhesive bonds the keys 94 and the sacrificial pins 46 and 136. The resin is electrically non-conductive so that the housing 12 is electrically insulated from the mandrel 14. Various types of adhesives may be injected into the space 92. Preferred adhesives which perform the insulating function and as well bond the metal surfaces together are preferably epoxy based adhesives.

Figure 3C:
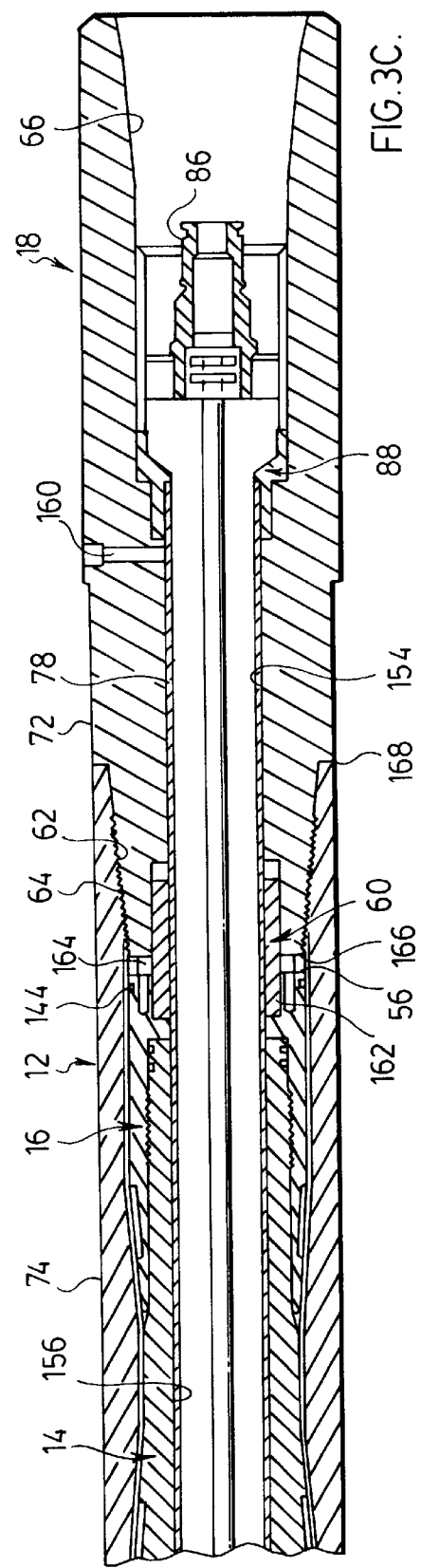

The balance of the connector is shown in FIG. 3C where the coupler 18 has the internal female threaded portion 66 to receive the threaded male portion of the upper drill rod. The coupling 18 has the threaded end portion 62 threaded within the internal threaded portion 64 of the housing 12. The coupler 18 has a hollow bore 154 which communicates with the bore 156 within the mandrel 14 which in turn communicates with the bore 96 of the coupler 20. This provides the hollow portion through which the wash tube 78 extends. The wash tube 78 is surrounded by grease or other suitable gel material. The grease is injected through port 160.

In order to electrically isolate the threaded portion 62 of the coupler 18 from the mandrel, a suitable gasket assembly 60 is provided. The gasket assembly 60 has a collar portion 162 which carries an enlarged ridge 164 which is sandwiched between the end 166 of the coupler 18 and the face 56 of the tapered collar 16. Hence, the coupler 18 is electrically isolated from the tapered collar 16 which in turn, as already described, is electrically insulated from the housing 12. As previously noted, the diameter of shoulder 72 is the same as the diameter 74 of the exterior surface of the housing 12 which is the same diameter as the shoulder 76 of jam nut 32. The wear protective material is applied over this area and is fixed in place by suitable wear resistant polymeric coating. Such protective coating seals the joint 168 between the coupling 18 and the housing 12.

Figure 4:
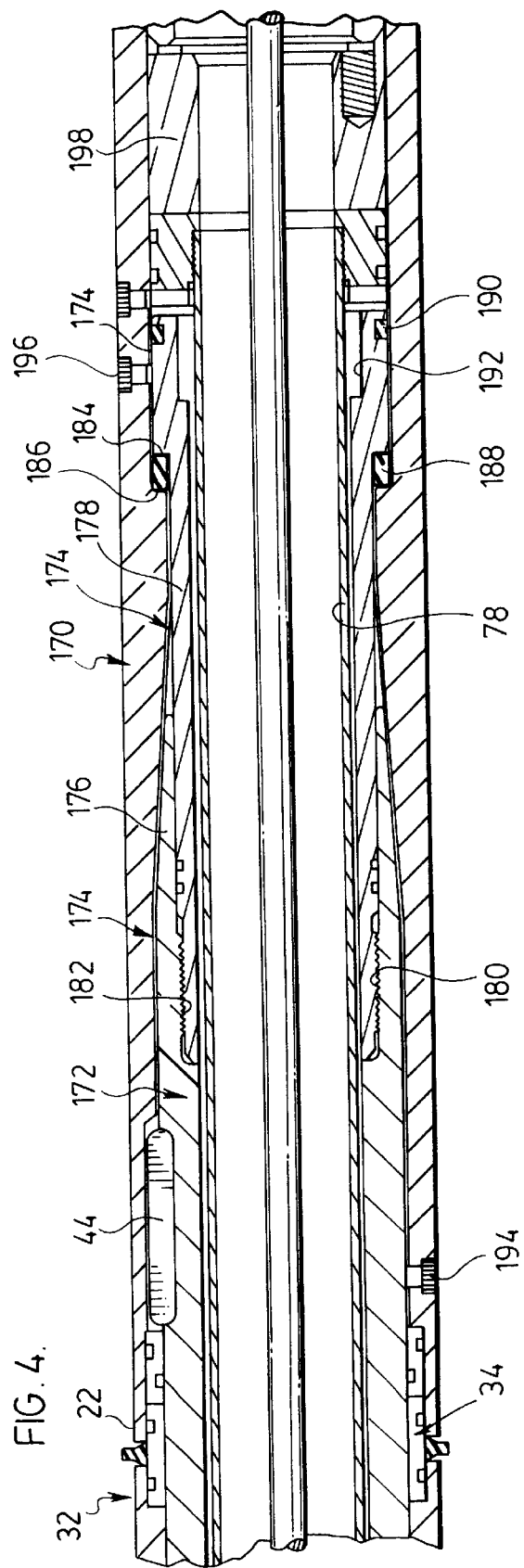
FIG. 4 is an enlarged sectional view of a portion of an alternative embodiment for the connector assemble.

Two alternative embodiments for the subassembly electrical isolation connectors are shown in FIGS. 4 and 5. With reference to FIG. 4, the housing 170 is mechanically connected to the mandrel 172 but spaced therefrom by the space 174. The housing is drawn onto the tapered portion 176 of the mandrel by way of a bolt 178. The bolt 178 has an external thread 180 which is threaded onto the internal thread 182 within the mandrel 172. The bolt 178 has a shoulder 184 which is spaced from the shoulder 186 within the housing 170. The gap is filled with an electrically non-conductive rigid spacer ring 188. When the bolt 178 is threaded into the mandrel 172, the rigid spacer 188 stops the drawing of the housing 170 onto the mandrel 172 to define the space 174, as determined by the width of the spacer 188. The space 174 continues along the mandrel and across the surface of the bolt 178 past the spacer 188 and up to the seal 190 provided in the bolt 178. The bolt includes an internal hex socket 192 to permit tightening of the bolt within the mandrel. Suitable resin is injected through inlet 194 and by vacuum, drawn through outlet 196. When the space 174 is filled, the holes are plugged to complete the assembly. The housing isolated end 22 is isolated from the jam nut 32 by way of usual gasket assembly 34, as described with respect to FIG. 3A. A suitable wash tube 78 passes through the connector. Components for supporting the electrical connections are provided within the housing at 198.

As shown in FIG. 5, the subassembly connector 200 has a housing 202 and a mandrel 204. The housing 202 is advanced onto the tapered portion 206 of the mandrel by way of a nut 208 being threaded onto the end 210 of the mandrel. The nut 208 has an internal thread 212 which threads onto the external thread 214 of the mandrel. A spacer ring 216 of a rigid electrically non-conductive material isolates the nut 208 from the housing. The precisely machined keys 44 define the spacing 218 between the housing and the mandrel. In the usual manner, electrically non-conductive resin is injected through inlet 220 and by vacuum drawn out of outlet 222. The resin is contained by way of seal 224 and the usual gasket seal 36 at the housing isolated end 22. A suitable wash pipe 78 extends through the connector. The wash pipe is isolated from the inside of the mandrel by way of injecting grease through inlet 226. A suitable electrical connector 228 is provided within the housing 202.

Although the further alternative embodiment of FIGS. 6A through 6D illustrate several variations in respect of the subassembly electrical isolation connector design, the two principal features of this alternative embodiment reside in the use of a threaded tube bolt to provide for the connection of the housing to the mandrel where the housing and the mandrel have cylindrical shaped mating surfaces. Secondly, the subassembly connector has a sealing mechanism for the wash pipe which compensates for changes in drilling mud pressure as the drill string advances underground. The assembly of FIG. 6 generally designated 230 has a housing 232 which is connected to a first upstream tubular drill rod 234. The connection is provided by tapered interlocking threads 236. As with the other embodiments, the usual electrical module (EM) antenna 238 extends through the hollow interior 240 of the tubular drill string and subassembly connector 232. As is appreciated, the drilling mud flows through this hollow region to supply the necessary fluids to the drilling bit. An internal snap ring 242 is provided through which the antenna 238 extends. A special sealing mechanism generally designated 244 is provided in the housing 232 for purposes of sealing the wash pipe 246. The sealing mechanism has a diaphragm 248 with a pressure compensation housing 250. The usual O-ring seal is provided at 252 for the device. The housing 232 is connected to the mandrel 254 by use of a tube bolt 256. The sealing device 244 includes a tube bolt bushing 258 as well as a static seal 260. Details of this wash pipe sealing and pressure compensating mechanism 244 will be described in more detail with respect to FIG. 7.

The tube bolt 256 interacts with the housing interior by way of tube bolt bushing 262. The tube bolt 256 threadably engages the mandrel 254 at threaded portions 264 for the bolt 256 and 266 for the interior surface of the mandrel 254. The threaded tubular bolt 256 includes the usual O-ring seals 268 to seal against the interior shoulder 270 of the mandrel. The bolt 256 is secured in place by way of a wrench engaging internal hex-nut shoulders 272. Such tightening of the bolt is achieve before installation of the wash pipe 246, wash pipe seal 244 and antenna 238. The mandrel 254 has an integral tapered threaded portion 274 for connection to a downstream second tubular drill rod. The mandrel extends within the housing 232 from its recess area 276 to its threaded portion 266. The distal end 278 of the mandrel abuts a lower castled shoulder 280 which is positioned within the recessed portion 282 of the housing 232.

The mandrel 254 is provided with the usual slots 284 which are aligned with corresponding slot portions 286 in the housing 232. The usual electrically insulative torsion pins or keys 288 are positioned in the mating slots to achieve mechanical interconnection of the housing 232 with the mandrel 254. A seal ring 290 is provided in the recessed area 276 with the mandrel. The seal ring 290 is positioned within the recessed area 292 at the housing free end 293 and carries the usual O-ring seals 294 and 296 for sealing with the interior surface of the recess 292 of the housing 232 and the exterior surface of the recess 276 of the mandrel 254. The free end of the antenna 238 is mounted in the lower antenna spider 298 in the threaded aperture 300. About the threaded aperture 300 are the usual openings 302 to allow the drilling mud to flow through the interior of the subassembly connector. The wash pipe 246 is inserted within the subassembly and fits within the tubular bolt 256 along the interior surface 304 of the mandrel and is sealed at downstream end by lower wash pipe seal 308 having the usual O-ring seal 306. The wash pipe 246 has a stepped shoulder at 310 for engaging the lower seal 308. The upstream end 312 of the wash pipe is fitted within the special sealing and pressure compensating device 244 as will described in more detail in FIG. 7. The wash pipe 246 has an exterior surface 314 which fits within the interior surface 316 of the tubular bolt 256 as well as the interior surface 304 of the mandrel 254. The sealing device 244 ensures at all times that the space between these two surfaces is properly sealed so that drilling muds cannot enter in this space and affect the electrical isolation of the housing 232 from the mandrel 254.

The electrical isolation of the housing 232 from the mandrel 254 is achieved by way of providing a space between the mandrel and the housing. This space 318 is defined between the interior surface 320 of the housing and the exterior surface 322 of the mandrel. In addition, the interior surface 320 of the housing is spaced from the exterior surface 324 of the tubular bolt 256. The mandrel, housing and tubular bolt are machined to define this space where the space is contained and defined between seal 262 and the distal end 326 of the seal 290. The advance of the housing onto the mandrel by advancing the tubular bolt 256 is blocked by the interaction of the distal end 270 of the bolt 256 and the shoulder 334 of the mandrel. In the usual manner, insulative material is injected into space 318 by way of injection plugs 328 and 330. If material is injected through port 328, any gases in the space are allowed to escape or drawn through removed plug 330. The connection of the housing to the mandrel is now complete with the bolt position tightened in place with the seals 262 and 280 locked down and the O-rings 268 ensuring that the distal end 270 of the bolt abuts the shoulder 334 of the mandrel to block advance of the housing and ensure thereby that the insulative space 318 remains.

The tubular bolt style of connection for the embodiment of FIG. 6 provides for maximum interior space 240 within the subassembly. This is particularly important with smaller diameter drill rod where it is desired to achieve maximum interior space so as to maximize drilling mud flow and also provide for ease in location of the interior antenna. The housing continues to overlap the mandrel by a significant extent to ensure a subassembly connection which will withstand the torsion, bending and stress and strain movements during drilling.

Figure 6A:
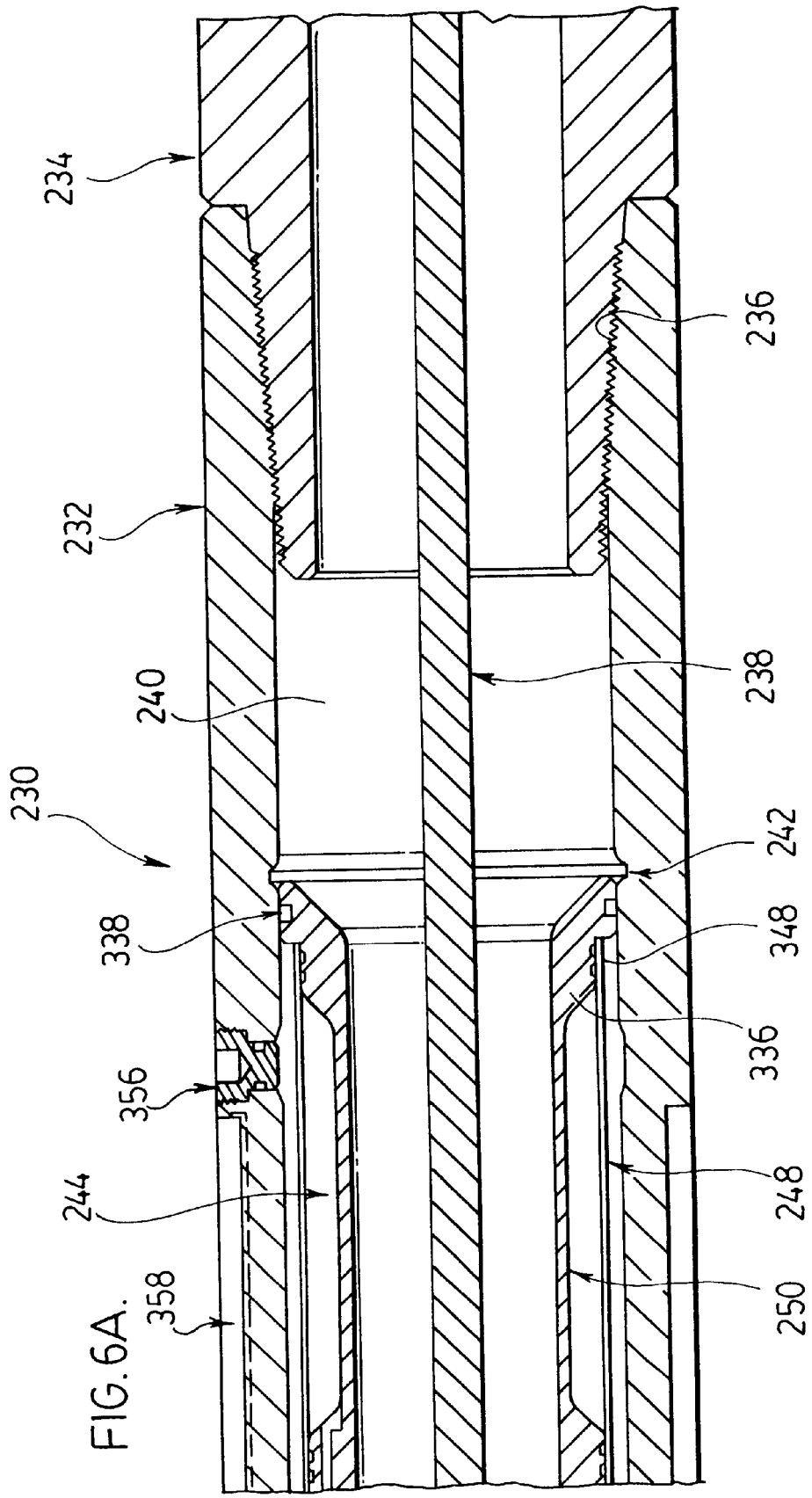
FIGS. 6A, 6B, 6C and 6D are enlarged sections of an alternative embodiment for the connector assembly.
Figure 7:
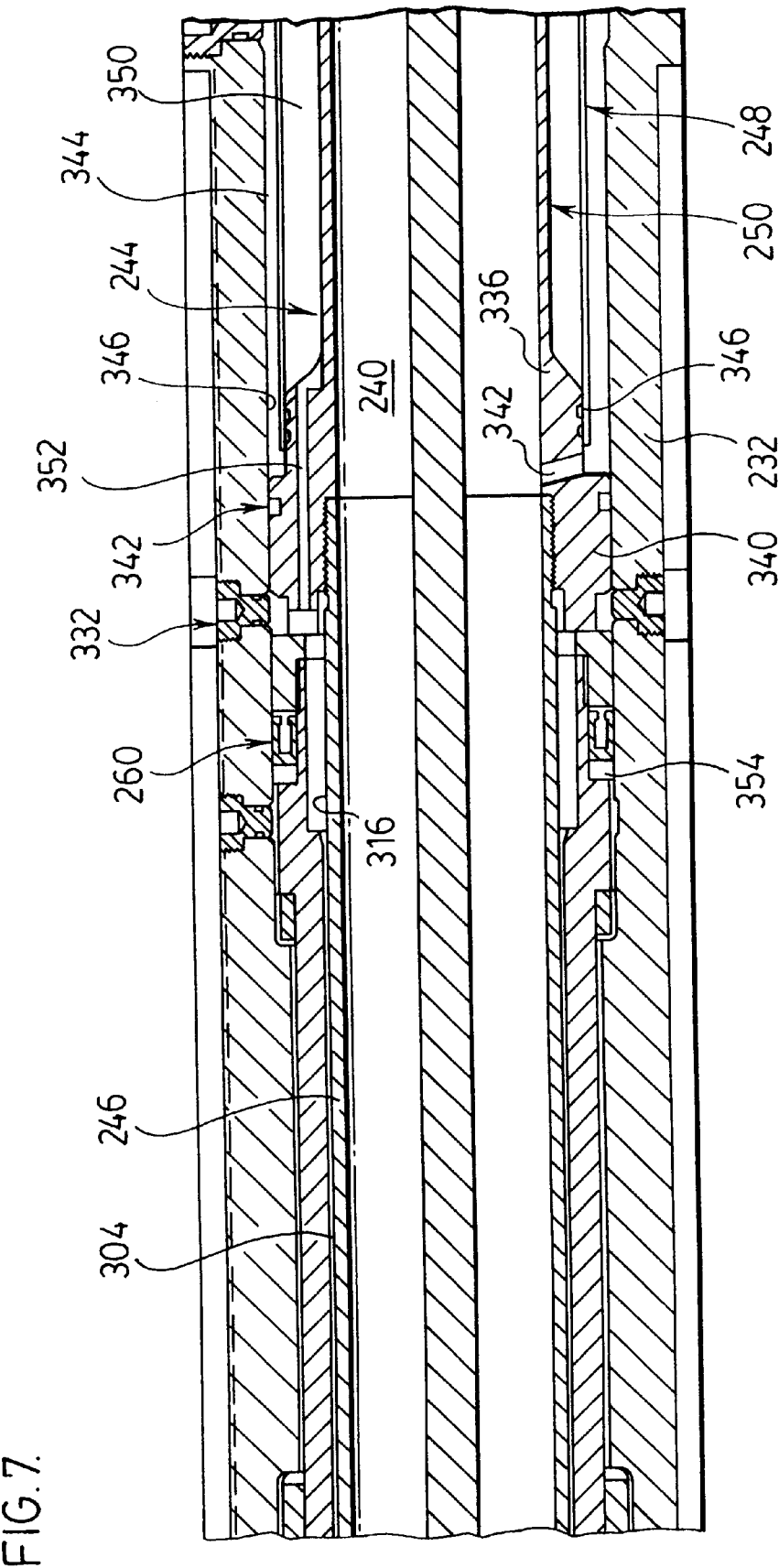
FIG. 7 is an enlarged section of the embodiment of FIG. 6 showing details of a wash pipe seal mechanism.

As shown in FIG. 7, a special wash pipe seal and mud pressure compensating device 244 is provided. The device comprises a compensation housing 250 and a tough, but flexible diaphragm 248. The housing 250 includes a base portion 336 which extends along within the housing 232 and abuts the snap ring 242 as shown in FIG. 6A. The base 336 includes the usual O-ring seal 338, also as shown in FIG. 6A. The base 336 has an annular shoulder 340 which also includes an O-ring seal 342. Extending through the base portion 336 is a plurality of passages 342 which are in communication with the annular space 344 defined between the diaphragm 248 and the interior 346 of the housing 232. The passageways permit mud which flows along the interior 240 of the subassembly to flow to within the annular space 344.

Figure 6B:
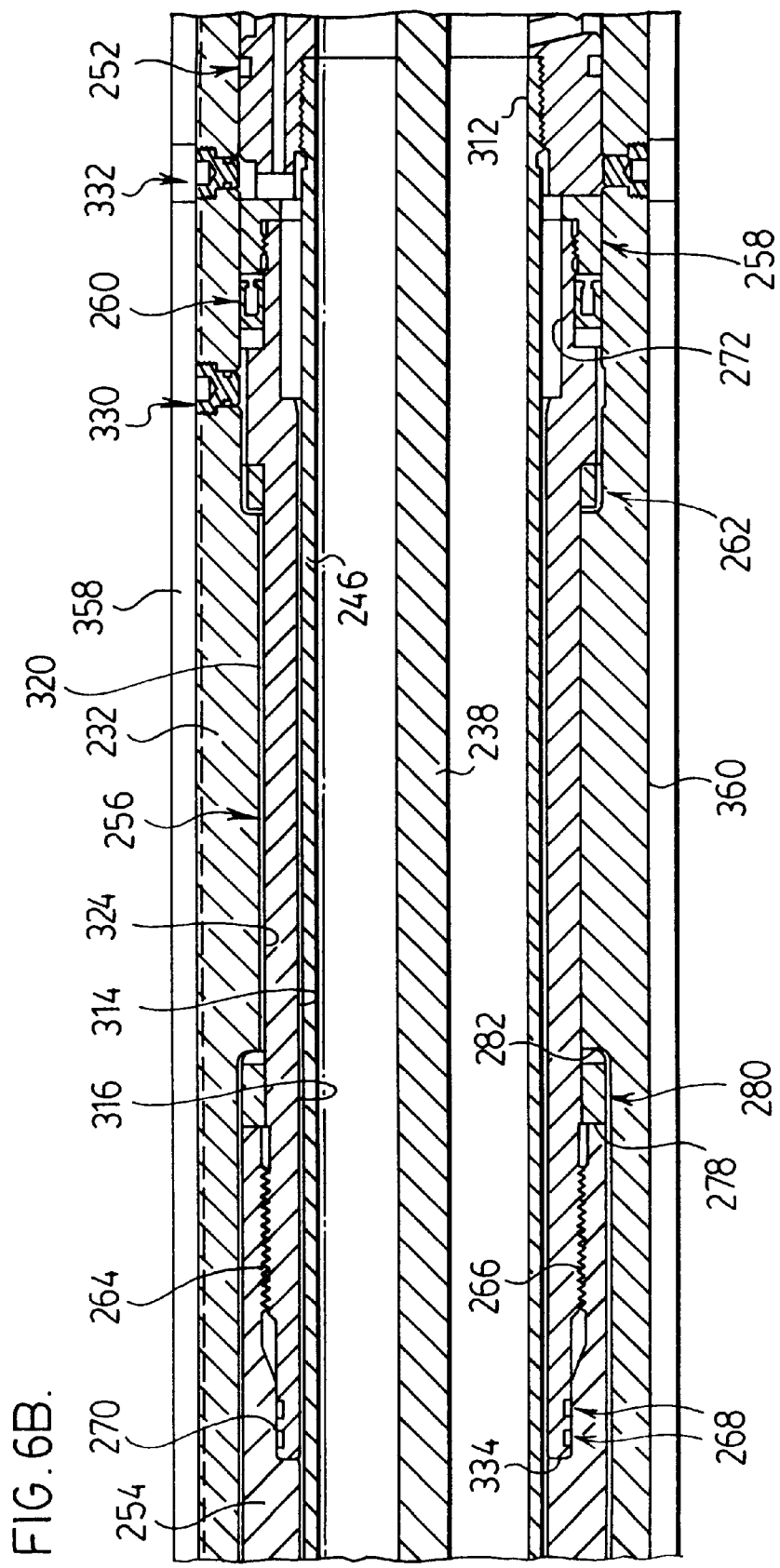
Figure 6C:
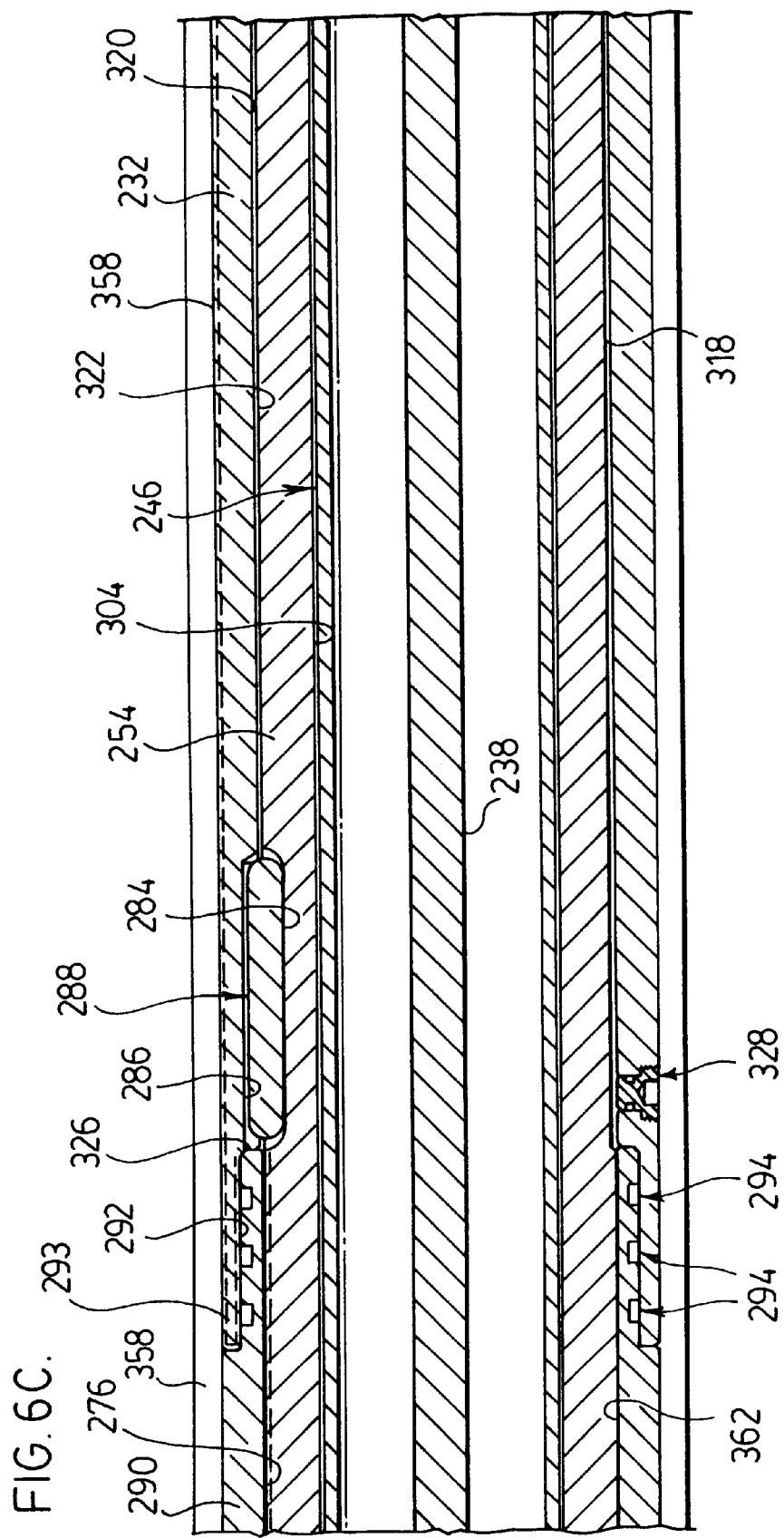
Figure 6D:
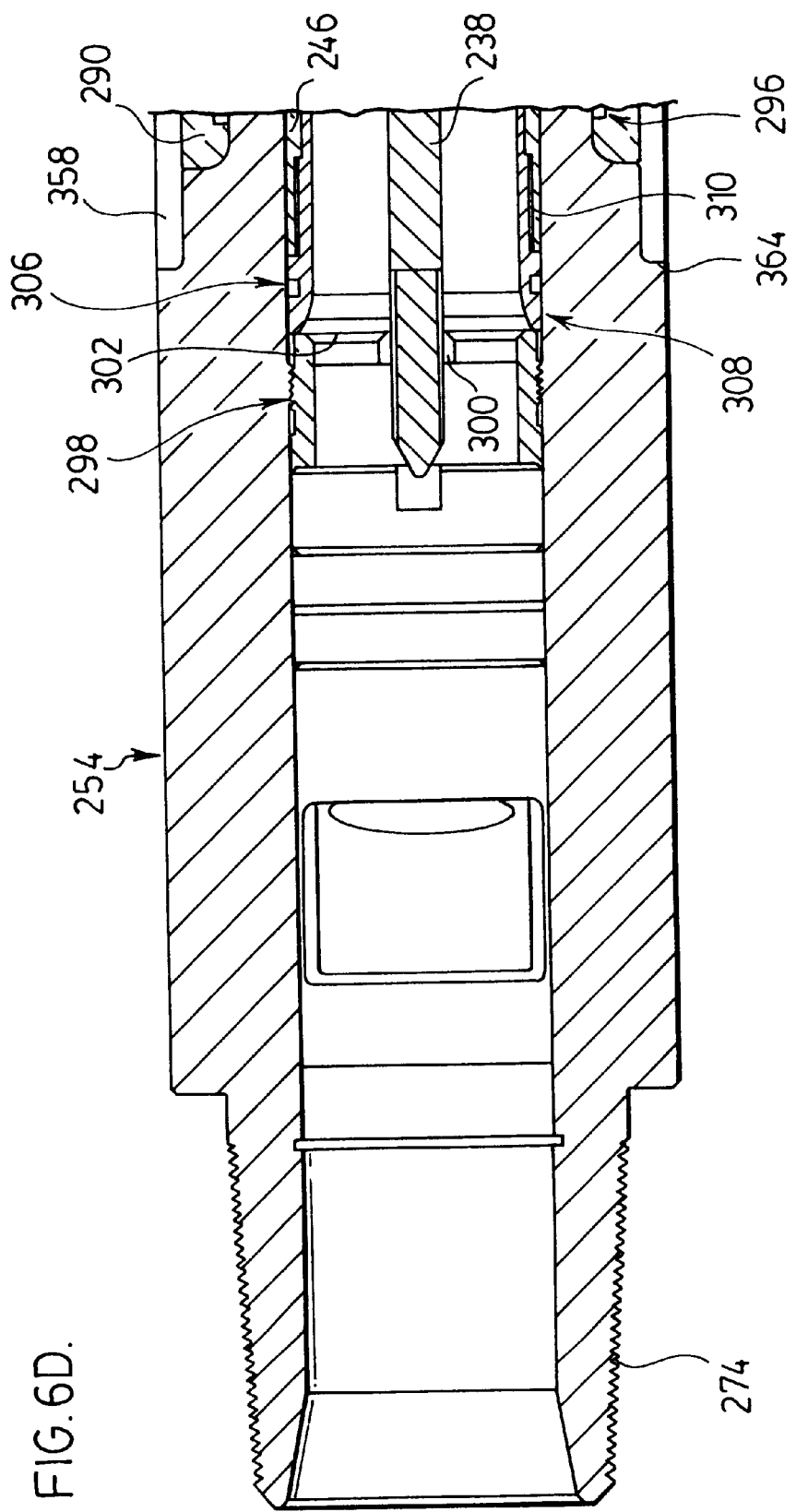

The diaphragm 248 is sealed and secured to the body portion 336 at extremities 346 as shown in FIG. 7 and 348 as shown in FIG. 6A. An oil reservoir 350 is defined within the diaphragm 248. A plurality of passageways 352 provide communication between the oil reservoir 350 and the exterior 316 of the wash pipe 246. The space 304 between the wash pipe 246 and the interior 314 of the bolt and of the mandrel is pressurized with oil from the reservoir 350. As the pressure of the drilling mud in interior space 240 changes due to varying hydrostatic pressure of the mud plus the pump pressure for the mud, such pressure is equalized in the space 304 between the wash pipe and the connector by way of the special seal 244. The varying pressure of the mud is translated by the diaphragm 248 into varying the pressure of the oil provided in chamber 244. The mud communicates with the annular space 344 through passages 342. The diaphragm is allowed to move inwardly or outwardly depending upon mud pressure. Such movement pumps oil through the passageway 352 and into the space between the wash pipe and the connector. Hence the mud pressure is equalized with the oil pressure so that the seals at 260 and at the downstream end at 306 are not distressed and hence do not allow mud to flow into the space between the wash pipe, the bolt connector and the mandrel. In accordance with a preferred embodiment, wash pipe assembly provides approximately one meter of electrical insulation in the interior of the isolation sub. The seal 260 may be made of metal to withstand the higher pressures within annular recess 354 as the pressure of the oil changes due to mud pressure. The downstream end of the wash pipe is sealed in a wash pipe cup with a threaded connection and adhesive as shown in FIG. 6D. Air is removed from the oil reservoir 350 by use of plug 332 before oil is injected into the space 350. This diaphragm is designed to equalize the hydrostatic pressure plus pump pressure of the mud by way of the silicon oil. As the subassembly travels down hole, the mud pressure will increase causing the diaphragm to move inwardly and further compress the oil. This will increase the silicon oil pressure until the differential across the wash pipe seals is zero, because the pressure is the same on the inside for the drilling mud and on the outside for the silicon oil. Hence the system can withstand any pressure applied as the subassembly comes back to the surface. Hence the wash pipe provides extremely beneficial insulation of the assembly over a substantial length of one meter or more.

The primary reason for using oil is to allow the easy removal and replacement of the wash pipe. It is possible to leave the down hole side of the wash pipe open to the drilling fluid without compromising the electrical resistance. However, allowing the mud to dry and harden in the annulus between the sub ID and the wash pipe OD would make it difficult to remove the wash pipe for regular service or replacement. Hence the pressure compensating sealing system of FIG. 7 is far superior.

The sealing mechanism of FIG. 7 also ensures that the subassembly cannot short out unless a hole is punctured in the wash pipe. Electrically speaking, if the housing 232 were positive and the mandrel were negative, electrical current would need to flow through the drilling mud from the housing side along the length of the wash pipe and therebeyond before it comes in contact with the mandrel. This electrical path, which is normally at least one meter in length, ensures the effective necessary insulation of the upper drill string from a lower drill string and hence very efficient functioning of the antenna 238.

A further feature of the invention is the coating with a ceramic on the exterior recess portion of the housing and corresponding mating recess portion of the mandrel. With reference to FIGS. 6A through 6D, the housing 232 has a recessed portion commencing at plug 356. The recess is designated generally 358 which extends over the wash pipe as shown in FIGS. 6B and 6C. The seal 290, which fits into the recess 276 of the mandrel, forms the continuum of the recess 358 through to the end of the recess 358 as shown in FIG. 6D. The wall 360 of the recess 358 is coated with a ceramic material to supplement the insulative characteristics of the subassembly and its durability. The ceramic coating extends entirely along wall 360 and correspondingly along the wall 362 of the recess 276 of the mandrel 254. The coating along the wall 362 extends from the commencement of the recess in the mandrel at stepped portion 364 toward and up to the slots 282 for the torque transmitting keys 288. The ceramic coating also extends around the free end 293 of the housing and over top of the seal 290. The ceramic coating as applied to the exterior portions of the housing and mandrel is preferably non-porous and functions extremely well as an insulator. Although the ceramic coating is brittle, it is able to compensate for slight bends in the subassembly without cracking; that is the ceramic coating has the capability of flexing with the subassembly during extreme conditions of use. Overlaying the ceramic coating is the usual protective wrapping, such as wrapping 70 as discussed with respect to FIG. 1. Preferably the wrapping may be made of Kevlar cord which is wound onto the recessed portion 358 of the housing as well as over the seal 290 of the mandrel and held in place by the use of a suitable cured epoxy resin.

Figure 8:
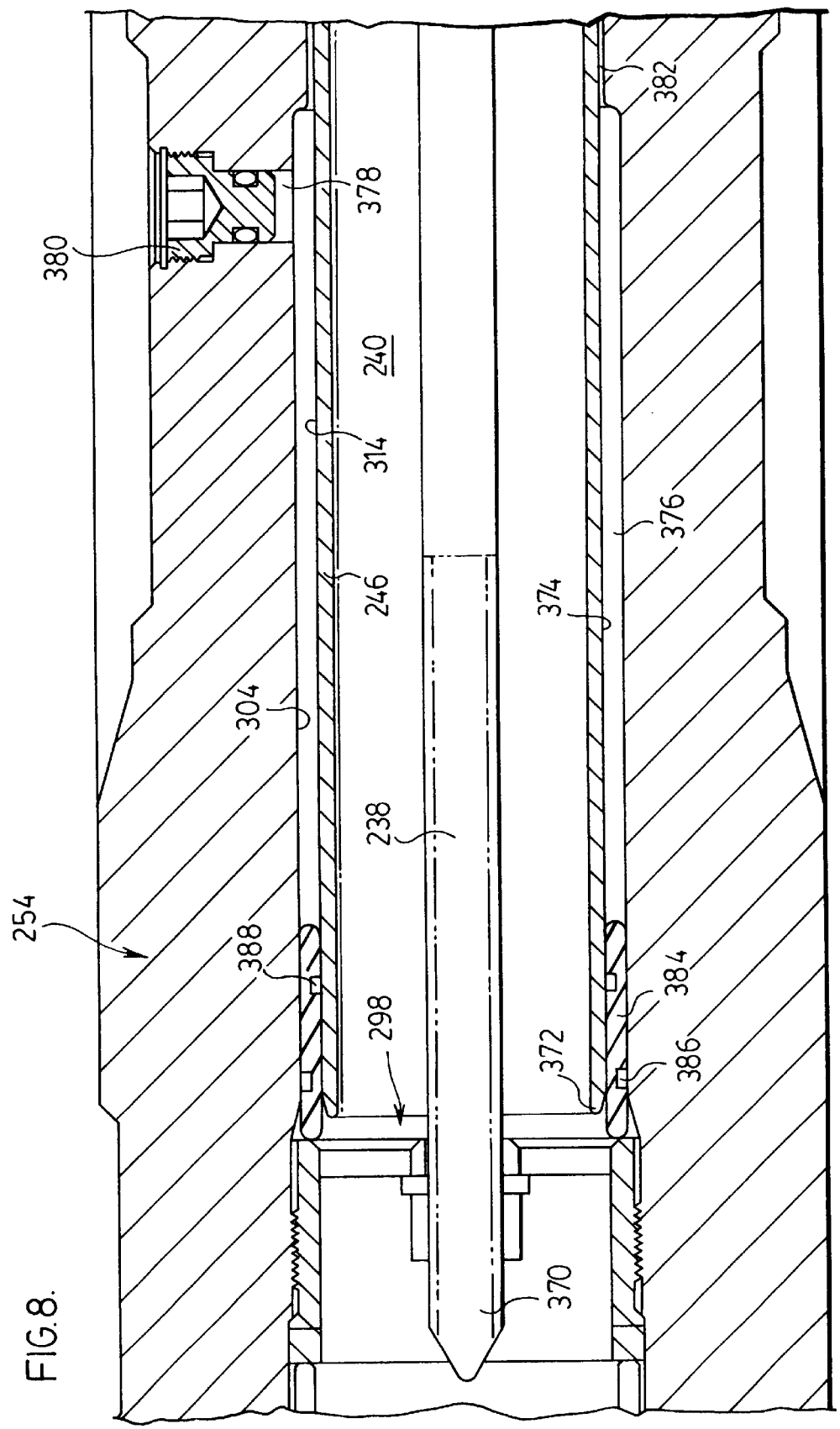
FIG. 8 is an enlarged section of an alternative embodiment for the wash pipe seal mechanism.

In accordance with an alternative embodiment of the invention a pressure compensating seal for the wash pipe is shown in the enlarged section of FIG. 8. The antenna 238 has its free end 370 mounted in the usual spider 298 which is supported within the mandrel 254. The wash pipe 246 fits within the housing and the mandrel in the usual manner where at its free end 372 within the mandrel 254 it is open to the space 240. The inner surface 374 of the wash pipe is spaced from the interior surface 304 of the mandrel to define an oil reservoir 376. Oil may be introduced to the reservoir through bore 378 which is sealed by threaded plug 380. The wash pipe 246 slides within the mandrel 254 and the housing to define along the majority of its length a narrow annular space 382. The oil is contained in the reservoir 376 by a sliding seal 384 which is of stainless steel and includes two O-ring seals 386 and 388. The sliding seal 384 moves relative to the stationary wash pipe 246 depending upon the mud pressure within the central flow through space 240. As the hydraulic pressure of the mud increases the seal 384 moves to the right in respect of FIG. 8 to increase the pressure on the oil in the reservoir 376 and hence increase the pressure of the oil along the entire wash pipe to balance the mud pressure on the inside of the wash pipe with the oil pressure on the outside of the wash pipe. Hence, in a manner similar to the diaphragm pressure compensating system of FIG. 7 the system can withstand any pressure applied as the sub-assembly comes back to the surface or is introduced down the hole. Correspondingly as the mud pressure decreases the seal 384 moves to the left to decrease the pressure on the oil in reservoir 376. It is understood, of course, that the other end of the wash pipe is sealed in the housing with a sealing arrangement similar to that shown in FIG. 7, however, without the need of the diaphragm pressure compensating system.

A feature of the embodiment of FIG. 1 is that the mandrel and the housing have mating tapered conical portions which converge towards the mandrel free end away from the end of the housing that is isolated from the mandrel. The housing overlaps at least a portion, if not all of the tapered portion of the mandrel. It has been found that this structure provides many advantages and features which are not apparent from the alternative structures of the prior art. By having the housing overlap the mandrel, the bending moments induced in the connector are transferred through the connector from the upper drill rod to the lower drill rod. The keys which interconnect the housing to the mandrel for transferring torque from the housing to the mandrel may sheer under extremely high loads applied to the drill rod. Shearing however of the keys does not result in loss of the equipment below the housing. Instead, the mandrel is interconnected to the housing and in the event of torsion failure, the upper drill rod pulls on the connector which causes the tapered surfaces to mate by virtue of the pull on the mandrel so that all components below the subassembly connector are pulled back as well.

With prior art devices the taper is in the opposite direction such that when the unit breaks up due to excessive torsion loads, the tapers separate and leave behind the components at the base of the bore hole. With the various embodiments of this invention, for example with respect to FIG. 1, the tapered collar 16 connected to the end of the mandrel ensures that the mandrel is pulled from the hole which in turn is carried up with the housing 12. Similarly, with the bolt style of interconnection of FIGS. 4 and 6, in the event of failure of torque pins 44, pulling on the upper assembly of the housing in turn pulls on the bolt which is connected to the mandrel for pulling it out of the bore hole. The failure of the pins 44 and the adhesive in the space does not break the threaded engagement between the bolt and the mandrel, similarly with the collar of FIG. 1. Also with the nut approach of FIG. 5, a breaking of the pins 44 and the adhesive in the space between the mandrel and the housing does not break the threaded engagement of the nut with the end of the mandrel. In each instance a pulling of the upper drill rod correspondingly draws on the housing and hence the connector for interconnecting the housing to the mandrel is not broken. The tapered surfaces of the embodiments of FIGS. 4 and 5 interact to achieve withdrawal of the components below the subassembly. The arrangement of FIG. 6 also works equally well in that shearing of torque transmitting keys 288 still permits extraction of the subassembly due to the mandrel interfering with the housing as caused by the tube bolt connector 256.

The overlapping of the housing isolated end with the mandrel ensures that bending forces are transmitted along the length of the housing rather being localized at the isolated end. This avoids breakup of the connection in this region. In addition, the interaction of the tapered surfaces of the housing and mandrel ensure that the subconnector assembly when under tension or compression, can withstand the expected loads without breakup and having sufficient load carrying capacity to draw from the bore hole the drill bit and other components below the subconnector assembly. The sub-connector assembly of this invention also provides an increased flow area through the central region of the assembly which permits the insertion of additional instrumentation through the subassembly. This feature can be particularly achieved by the subassembly embodiment of FIGS. 5 and 6 which minimizes the intrusion of the connectors to within the inner space.

Although preferred embodiments of the invention have been described herein in detail, it will be understood by those skilled in the art that variations may be made thereto without departing from the spirit of the invention or the scope of the appended claims.

What is claimed is:

1. A subassembly electrical isolation connector for interconnecting adjacent tubular drill rods of a drilling system used in drilling bore holes in earth formations, said connector electrically isolating such interconnected drill rods, said connector comprising:
   i) a housing;
   ii) a mandrel;
   iii) means for connecting said housing to a first tubular drill rod;
   iv) means for connecting said mandrel to a second tubular drill rod;
   v) means for interconnecting said housing and said mandrel in a manner to electrically isolate said housing from said mandrel with said housing overlapping at least a portion of said mandrel;
   vi) said housing having an end which is electrically isolated from said mandrel and said means for connecting said mandrel to a second tubular drill rod;
   vii) said interconnecting means including a tubular fastener for threadable engagement with said mandrel and said tubular fastener having a shoulder for engagement with said housing to advance said housing over said mandrel;
   viii) means for blocking advance of said housing onto said mandrel to ensure definition of an electrical insulation space between said mandrel and said housing.

2. A connector of claim 1 wherein:
   ix) said mandrel has a conical tapered body portion which is located within said housing and said housing has a corresponding conically tapered inner surface;
   x) said conical taper for said housing and said mandrel converging inwardly away from said housing isolated end.

3. A connector of claim 2 wherein said means for blocking advance of said housing onto said mandrel, spaces apart said tapered corresponding surfaces of said housing and said mandrel, said interconnecting means comprising electrically non-conductive material provided in the same space between spaced apart surfaces for interconnecting said housing and said mandrel in a manner to transmit drilling forces from a first tubular rod to an interconnected second tubular rod whereby said opposing tapered surfaces accommodate bending moments along said connector.

4. A connector of claim 3 wherein said housing has a second tapered surface converging inwardly towards said first tapered surface, a collar having an outer tapered surface for engaging said second tapered surface in said housing and means for advancing said collar on said mandrel to locate said housing relative to said mandrel with said space defined between said opposing tapered surfaces of said housing and mandrel, means for electrically isolating said collar from a first tubular drill rod connected to said housing, said tapered surface of said collar providing for connection retrieval in the event of connector break-up due to excessive drilling forces.

5. A connector of claim 3 wherein electrically non-conductive keys interconnect said corresponding opposed tapered surfaces of said housing and said mandrel to transfer torque therebetween, said keys being formed of substantially equal dimension to provide said spacing means.

6. A connector of claim 2 wherein electrically non-conductive gasket separates said housing isolated end from said mandrel, means engageable with said mandrel for clamping said gasket assembly against said housing isolated end, said gasket assembly accommodating flexure between housing and mandrel.

7. A connector of claim 4 wherein said electrically non-conductive material for interconnecting said housing and said mandrel comprising a plurality of non-conductive keys interengaging said tapered surfaces and providing said blocking means for defining said space, said tapered surfaces being secured by a high strength non-conductive adhesive filling said space between mandrel and housing tapered surfaces.

8. A connector of claim 3 wherein said mandrel has a threaded portion opposite said tapered surfaces, said mandrel having a recessed portion opposite said tapered surface for receiving said fastener in the form of a nut threaded onto said mandrel threaded portion, means for defining a space between said opposing tapered surfaces of said housing and mandrel, means for electrically isolating said nut from said first tubular drill rod connected to said housing.

9. A connector of claim 2 for use in directional drilling of an oil well bore hole.

10. A connector of claim 2 for use in directional drilling of a bore hole around or under obstacles in an earth formation.

11. A connector of claim 2 for use in bore hole inspection in an earth formation.

12. A connector of claim 1 wherein said tubular fastener is a threaded tube bolt having an external thread on an end which is opposite said shoulder, said tubular bolt engaging said mandrel, said mandrel having a cylindrical external body portion for telescopic positioning in said housing having a corresponding cylindrical shaped internal surface, said housing internal surface being spaced from said mandrel body portion to define said insulation space, said means for blocking advance ensuring said insulation space remains after assembly of connector.

13. A connector of claim 1 wherein a wash pipe extends along and within hollow interior of said connector, means for sealing a space between said wash pipe and said hollow interior at each end of said wash pipe, an oil reservoir in sealed communication with said space between said wash pipe and connector hollow interior, an oil compressor means in communication with pressurized mud passing through said connector, said oil compressor pressurizing oil in said space in a synchronized manner with said mud pressure.

14. A connector of claim 13 wherein said oil compressor means is a diaphragm.

15. A connector of claim 13 wherein said oil compressor means is located at one of said wash pipe ends, said seal adjacent said wash pipe end being moveable in response to a change in oil pressure.

16. A connector of claim 1 wherein exterior of said housing is coated with ceramic material.

17. A connector of claim 16 wherein said housing terminates short of an external shoulder on said mandrel to define a recess between said housing terminus and said mandrel external shoulder, said recess portion of said mandrel being coated with ceramic for insulating said housing terminus from said mandrel.

18. A connector of claim 17 wherein said housing is connected to said mandrel by insulative keys.

* * * * *